(12) United States Patent
Sundar et al.

(10) Patent No.: US 12,107,958 B2
(45) Date of Patent: Oct. 1, 2024

(54) END-TO-END ENCRYPTION FOR SESSIONLESS COMMUNICATIONS

(71) Applicant: Citicorp Credit Services, Inc. (USA), Jacksonville, FL (US)

(72) Inventors: Gayathri Sundar, Irving, TX (US); Mayank Shah, East Windsor, NJ (US)

(73) Assignee: CITICORP CREDIT SERVICES, INC. (USA), Jacksonville, FL (US)

( * ) Notice: Subject to any disclaimer, the term of this patent is extended or adjusted under 35 U.S.C. 154(b) by 0 days.

(21) Appl. No.: 18/230,033

(22) Filed: Aug. 3, 2023

(65) Prior Publication Data

US 2023/0388123 A1 Nov. 30, 2023

Related U.S. Application Data

(63) Continuation of application No. 17/980,363, filed on Nov. 3, 2022, now Pat. No. 11,750,387, which is a continuation of application No. 17/317,261, filed on May 11, 2021, now Pat. No. 11,502,839.

(51) Int. Cl.
*H04L 9/32* (2006.01)
*H04L 9/08* (2006.01)
*H04L 9/14* (2006.01)

(52) U.S. Cl.
CPC .......... *H04L 9/3213* (2013.01); *H04L 9/0819* (2013.01); *H04L 9/0861* (2013.01); *H04L 9/14* (2013.01)

(58) Field of Classification Search
CPC ... H04L 9/3213; H04L 9/0819; H04L 9/0861; H04L 9/14
See application file for complete search history.

(56) References Cited

U.S. PATENT DOCUMENTS

| | | | |
|---|---|---|---|
| 9,160,731 B2 | 10/2015 | Chang et al. | |
| 2003/0217166 A1 | 11/2003 | Dal Canto et al. | |
| 2014/0101679 A1 | 4/2014 | Yin et al. | |
| 2017/0054726 A1* | 2/2017 | Friedmann | H04L 63/0428 |
| 2017/0346807 A1 | 11/2017 | Blasi | |
| 2020/0193033 A1* | 6/2020 | Kurmi | H04L 9/0894 |
| 2021/0083873 A1 | 3/2021 | Harris | |
| 2021/0226794 A1* | 7/2021 | Axdorff | H04W 12/084 |
| 2021/0234706 A1 | 7/2021 | Nair et al. | |

\* cited by examiner

*Primary Examiner* — Henry Tsang
(74) *Attorney, Agent, or Firm* — Foley & Lardner LLP

(57) ABSTRACT

Presented herein are systems and methods for end-to-end encryption for session-less communications. A first server may receive, from a second server, a request to retrieve keys for a customer device to access a service. The request may include a device identifier and a first token encrypted using a first encryption key. The first server may determine, responsive to validating, that the customer device is to be issued a second token. The first server may identify least a portion of the first token decrypted using the first encryption key. The first server may generate a set of second encryption keys to be used by the customer device. The first server may package the second token to include (i) at least the portion of the first token and (ii) the set of second encryption keys. The first server may transmit, to the second server, a response including the second token.

20 Claims, 10 Drawing Sheets

END-TO-END ENCRYPTION FOR SESSIONLESS COMMUNICATIONS

CROSS REFERENCE TO RELATED APPLICATIONS

This application claims priority under 35 U.S.C. § 120 as a continuation of U.S. patent application Ser. No. 17/980,363 titled "End-to-End Encryption for Sessionless Communications," filed Nov. 3, 2022, which claims priority under 35 U.S.C. § 120 as a continuation of U.S. patent application Ser. No. 17/317,261, titled "End-to-End Encryption for Sessionless Communications," filed May 11, 2021, each of which are incorporated herein by reference in their entireties.

TECHNICAL FIELD

This application generally relates to communications. In particular, the present application relates to end-to-end encryption for session-less communications.

BACKGROUND

An identity provider may manage the authentication of a user of a customer device to access a resource service and handle communication sessions between the customer device and the resource service. The user of the customer device may provide authentication credentials to the identity provider to be authenticated to access the resource. Upon authorization, the identity provider may initiate and establish a communication session between the customer device and the resource service. The customer device and the resource service may exchange data over the communication session. Maintenance of the session, however, may entail significant overhead at the identity provider, the customer device, and the resource service, thereby consuming computing resources and network bandwidth at each network entity.

SUMMARY

Disclosed herein are systems and methods for end-to-end encryption for session-less communications. In certain environments, a customer device can access resources hosted on a service via a client-side server (sometimes herein referred to as a partner server) and a gateway (sometimes herein referred to as an identity provider). The access to the resource service may be controlled and managed by the gateway. Furthermore, communications between the customer device and the resource service may be established and maintained by the partner server and the gateway.

Under one approach, the customer device may first send a request to access the service to the partner server. The request may include authentication credentials. The partner server in turn forwards the request to the gateway. Upon receipt, the gateway may validate the authentication credentials against those stored for the customer device. If the validation is successful, the gateway may generate a session information for a communication session between the customer device and the resource service. The session information may be stored and maintained at the gateway and may also be provided to the partner server and the customer device. Using the session information and other information particular to the partner server, the gateway may initiate the session with the partner server. In initiating the session, the customer device may send a separate request for encryption keys to be used to encrypt and decrypt data exchanged through the session. The encryption keys may also be stored and maintained at the gateway and be provided to the partner server and customer device. Once received, the customer device may commence accessing of the resources hosted on the service through the partner service and the gateway through the session. Likewise, the resources service may provide the requested resources to the customer device via the partner service and the gateway over the session. The data exchanged over the session may be encrypted and decrypted using the encryption keys.

There are a myriad of technical shortcomings with the maintenance of communication sessions to control access to the resources service using this approach. For one, there is considerable complexity in initiating and establishing the session for communications between the customer device and the resource service. This is due to the number of steps involved in initiating the communication session with requests and responses sent back and forth among the customer device, the partner server, the gateway, and the resource service. In addition, the complexity is also due to the network environment itself in which the customer device and the resource service communicate with each other through the partner server and the gateway. Furthermore, the establishment of the communication session may be dependent on the specifications and configurations of the partner server. Once the session is established, there is a significant amount of overhead involved in maintaining sessions for communications between each customer device and the resource server. This is because for each communication session, the gateway may have to store and keep the session information and the encryption keys thereby consuming computing resources such as processing power and storage space as well as network bandwidth.

To address these and other technical challenges, the gateway may generate and provide a token with encryption keys for session-less communications between the customer device and the resource service. To obtain access to the resource service, the customer device first sends a request obtain an access token to the gateway via the partner server. The request may be in the form of a HTTP POST call for a token in accordance with the OAUTH 2.0 protocol and may contain an initial token and a device identifier for the customer device along with an ephemeral key. When received from the customer device, the gateway may validate the contents of the request. If the validation is successful, the gateway (or another service associated with the gateway) generates a set of encryption keys and packages the encryption keys using the received ephemeral key as part of the access token. The encryption keys can be used to achieve end-to-end encryption in communications between the customer device and the resource service. The access token can define a token lifetime during which the access token and the associated set of encryption keys are valid for use. Upon generation, the gateway sends the access token to the customer device via the partner server. The access token and the set of encryption keys do not persist on the gateway (e.g., stored or maintained on a database of the gateway), but instead may persist on the customer device or partner server once received.

Subsequently, to access the resource service, the customer device may send a request that includes the access token with the encryption keys to the gateway via the partner server. The request may include data to be provided to the resource service or may be a request to fetch data from the resource service. If any data is provided to the resource service, the customer device may encrypt the data using one or more of the encryption keys that were provided by the gateway that was in the access token. Once encrypted, the customer device may include the encrypted data in the payload of the access request. Upon receipt from the customer device, the gateway may validate the access token included in the request. As part of the validation, the gateway may check whether the access token is still valid based on the token lifetime defined by the access token.

If the validation of the access token is successful, the gateway may process the request and generate a response in accordance with the results of the processing. In processing the request, when any data included in the request, the gateway may decrypt the encrypted data in the payload of the request using the same set of encryption keys provided within the access token as sent by the customer device, and may forward the decrypted data to the resource service. The resource service may in turn respond with an acknowledgement to the gateway and the gateway in turn forwards the acknowledgment to the customer device via the partner server. When data are to be fetched, the gateway may retrieve the requested data from the resource service, and may apply the encryption keys to the fetched data. The gateway may then forward the encrypted data as part of a response and send the response to the customer device via the partner server.

With the tokens and encryption keys not persistent at the gateway, the communications between the customer device and the resource service through the partner server and the gateway will be session-less. As the access token that contains the set of encryption keys is passed to the gateway each time the customer device accesses the resource service, end-to-end encryption can be achieved. By using session-less communications instead of communication sessions, the complexity arising from with the multiple steps in initiating and establishing the communications session between the customer device and the resource service may be avoided. Likewise, the overhead involving in maintaining the communication session may be reduced if not eliminated. Moreover, having the lifetime of the token defined by the access token itself may negate having to define a separate token lifetime policy at the gateway for these encryption keys, thus further reducing overhead for maintaining the communication session. In this manner, the computing resources and network bandwidth may be saved across all nodes of the network, including the customer device, the partner server, the gateway, and the resource service, all the while protecting data integrity using end-to-end encryption.

Aspects of present disclosure are directed to systems, methods, and non-transitory computer readable media for end-to-end encryption for session-less communications. A first server may receive, via an interface from a second server, a request to obtain grant for a customer device to access a service associated with the first server. The request may include a first token encrypted using a first encryption key. The first server may determine, responsive to validating the first token that the customer device is to be issued a second token for accessing the service. The first server may identify, responsive to the determination, at least a portion of the first token from the request decrypted using the first encryption key. The first server may generate a set of second encryption keys to be used by the customer device to encrypt and decrypt data communicated between the customer device and the first server. The first server may package the second token to include (i) at least the portion of the first token and (ii) the set of second encryption keys. The first server may transmit, via the interface to the second server, a response including the second token to be used by the customer device in accessing the service associated with the first server.

In one embodiment, the first server may receive, via the interface from the second server subsequent to transmitting the response, a second request for the customer device to access a resource of the service. The second request may include the second token. The first server may identify, responsive to validating the second token of the second request, the data accessed from the resource of the service based on the second request. The first server may transmit, via the interface to the second server, a second response including: (i) the data encrypted using at least one of the set of second encryption keys and (ii) the second token to be used to decrypt.

In another embodiment, the first server may receive, via the interface from the second server, subsequent to transmitting the response, a second request for the customer device to send the data to the service. The second request may include the second token and the data encrypted using at least one of the set of second encryption keys. The first server may store, on the service, responsive to validating the second token of the second request, the data from the second request decrypted using at least one of the set of second encryption keys. The first server may transmit, via the interface to the second server, a second response indicating storage of the data on the service.

In yet another embodiment, the first server may receive, via the interface from the second server subsequent to transmitting the response, a second request for the customer device to access the service. The second request may include the second token. The first server may determine, responsive to failure to validate the third token, that the customer device is to not be issued with a fourth token for accessing the service. The first server may restrict, responsive to determining that the customer device is not to be issued, the generation of a set of third encryption keys to transmit to the customer device. The first server may restrict, responsive to determining that the customer device is not to be issued, the generation of a set of third encryption keys to transmit to the customer device.

The first server may receive the request to retrieve keys. The request may include a third encryption key used by the customer device to encrypt and decrypt. The third encryption key may be encrypted using the first encryption key used by the first server and the second server. The first server may encrypt the second token using the third encryption key identified from the request. The second token may be decrypted by the server using the third encryption key.

The first server may determine that a device identifier of the first token is encrypted using the first encryption key. The first server may generate the set of second encryption keys, without maintaining the set of second encryption keys at the first server. The first server may enable session-less communications between the first server and the customer device via the second server using the second token included in the response. The first server may transmit, prior to receiving the request, the first encryption key to the second server via the interface, the first encryption key to be used in encrypting and decrypting the data communicated between the first server and the second server.

It is to be understood that both the foregoing general description and the following detailed description are exemplary and explanatory and are intended to provide further explanation of the embodiments described herein.

BRIEF DESCRIPTION OF THE DRAWINGS

The accompanying drawings constitute a part of this specification, illustrate an embodiment, and together with the specification, explain the subject matter of the disclosure.

DETAILED DESCRIPTION

Figure 1:
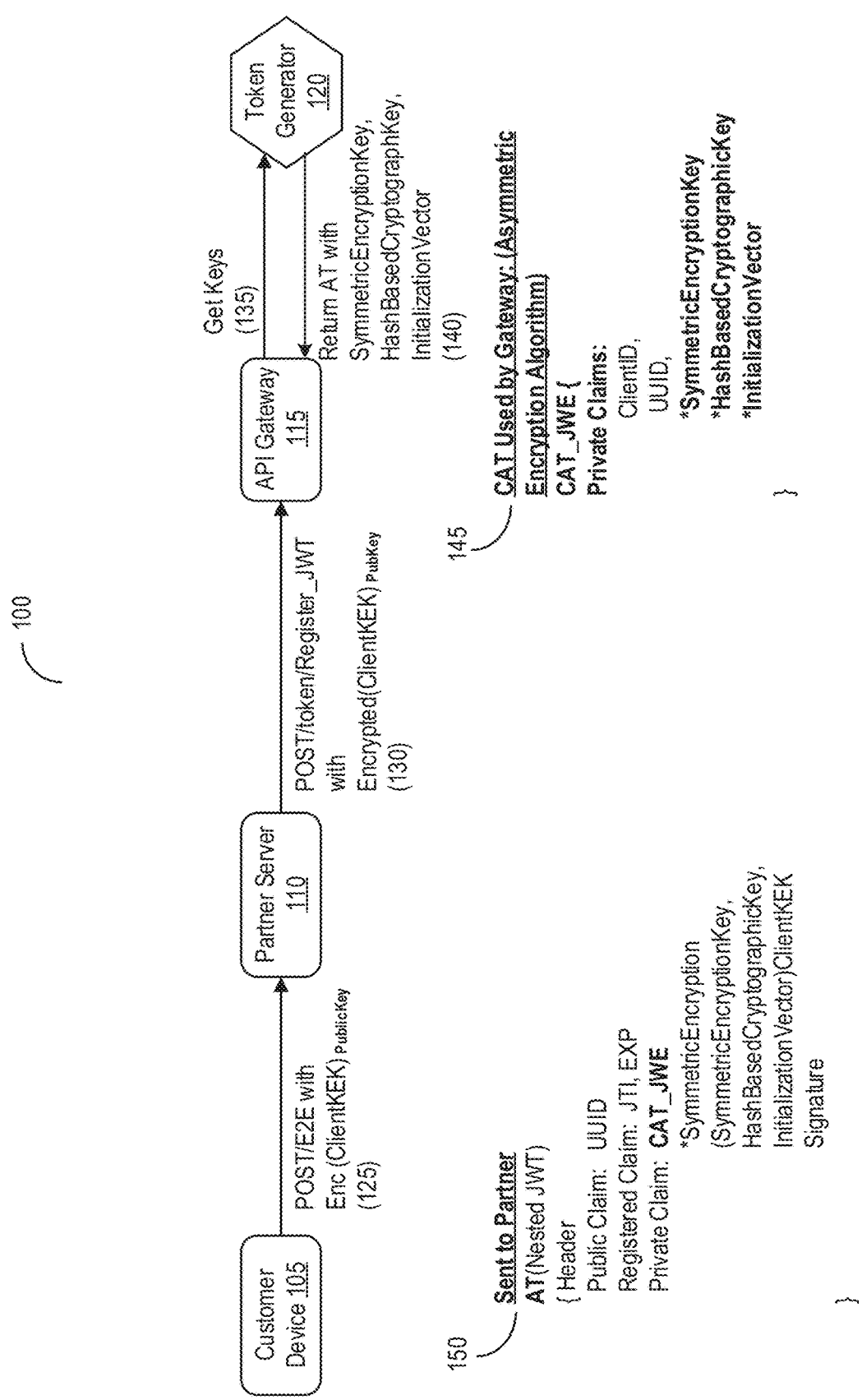
FIG. 1 illustrates a block diagram of an example environment for end-to-end encryption for session-less communications in accordance with an illustrative embodiment.

Reference will now be made to the embodiments illustrated in the drawings, and specific language will be used here to describe the same. It will nevertheless be understood that no limitation of the scope of the disclosure is thereby intended. Alterations and further modifications of the features illustrated here, and additional applications of the principles as illustrated here, which would occur to a person skilled in the relevant art and having possession of this disclosure, are to be considered within the scope of the disclosure.

The present disclosure is directed to systems and methods of end-to-end encryption for state-less communications. A customer device may access a resource service through a partner server and a gateway. Upon validation of a customer device, a gateway may generate and issue an access token that contains a set of encryption keys to be used for communications between the customer device and the resource service. The access token may also define a lifetime during which the access token and the encryption keys are valid. Once issued, the access token and the encryption keys may no longer persist on the gateway and may instead be stored and maintained at the customer device. Each time the customer device is to access the resource service, the customer device may send a request that includes the access token and the encryption keys to the gateway via the partner server. When received, the gateway may validate the access token and may decrypt the data in the payload of the request using the encryption keys. Upon validation, the gateway may forward the request with the decrypted payload to the resource service. The resource service may process the request and may return a response. The gateway in turn may encrypt the response using the encryption keys provided in the access request, and forward the response to the customer device via the partner server. In this manner, end-to-end encryption of communications between the resource server and the customer device may be achieved, while reducing complexity and overhead involved in initiating and maintaining communication states.

FIG. 1 depicts a block diagram of an environment 100 for end-to-end encryption for session-less communications. The environment 100 may include a customer device 105 (sometimes referred herein as a customer or a client device), a partner server 110 (sometimes referred herein as an access server), an application programming interface (API) gateway 115 (sometimes referred herein as a gateway), and a token generator 120, among others. The API gateway 115 and the token generator 120 may be operated by or otherwise associated with a resource provider or an application host. The partner server 110 may be operated by or otherwise associated with a partner entity that is authorized to access or otherwise interface with the API gateway 115 and the token generator 120. The customer device 105 may be operated by or otherwise associated with an end-user attempting to access the resource provider or the application host via the partner server 110. For example, the application host may be a service provided by a banking institution and the end-user may be a bank customer attempting to access an account maintained by the banking institution via the host.

Embodiments may comprise additional or alternative components or omit certain components from those of FIG. 1 and still fall within the scope of this disclosure. For example, the API gateway 115 and the token generator 120 may be part of the same device. Various hardware and software components of one or more public or private networks may interconnect the various components of the environment 100. Non-limiting examples of such networks may include Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

To access the resource service, the customer device 105 may send a request to retrieve keys to the partner server 110 (125). The request may be in the form of a HTTP POST call in accordance with the OAUTH 2.0 protocol, and may include an ephemeral encryption key (e.g., "ClientKEK" as depicted) previously provided by the partner server 110. The contents of the request including the ephemeral encryption key may be encrypted using a public key (e.g., "PublicKey" as depicted) previously provided out-of-band by the API gateway 115. Upon receipt, the partner server 110 may forward the request to retrieve keys to the API gateway 115 (130). The forwarded request may include the original contents of the request from the customer device 105 as well as a token used for validation at the API gateway 110. The token may be packaged in accordance with a format, such as a JavaScript Object Notation (JSON) object (e.g., a JSON web token (JWT)).

Upon receipt, the API gateway 115 may validate the request from the partner server 110 and if the validation is successful, may call the token generator 120 to retrieve keys (135). In response, the token generator 120 may generate and return a client access token (140). The client access token may be the token in the form of a customer access token ("CAT") 145. The client access token may include a set of identifiers such as a client identifier and a reference identifier. The client access token may also include a set of encryption keys, symmetric (e.g., Advanced Encryption Standard) encryption key, a hash-based cryptographic (e.g., key-hash message authentication code (HMAC)) encryption key, and an initialization vector, among others.

The API gateway 115 may encrypt the generated encryption keys using the ephemeral encryption key that was provided via the partner server 110, and may forward the signed access token to the partner server 110. With the encryption, the API gateway 115 may include the encryption keys as a private claim into an access token (e.g., a signed JWT). Upon receipt, the partner server 110 in turn may forward the access token to the customer device 105. The access token provided by the API gateway 115 may be a token in the form of an access token ("AT") 150. The token may include at least a portion of the access token generated by the token generator 120, such as the set of encryption keys. The token may also include information from the initial request as well as a signature generated by the API gateway 115. Using the access token, the customer device 105 may access a resource service via the partner server 110 and the API gateway 115.

Figure 2:
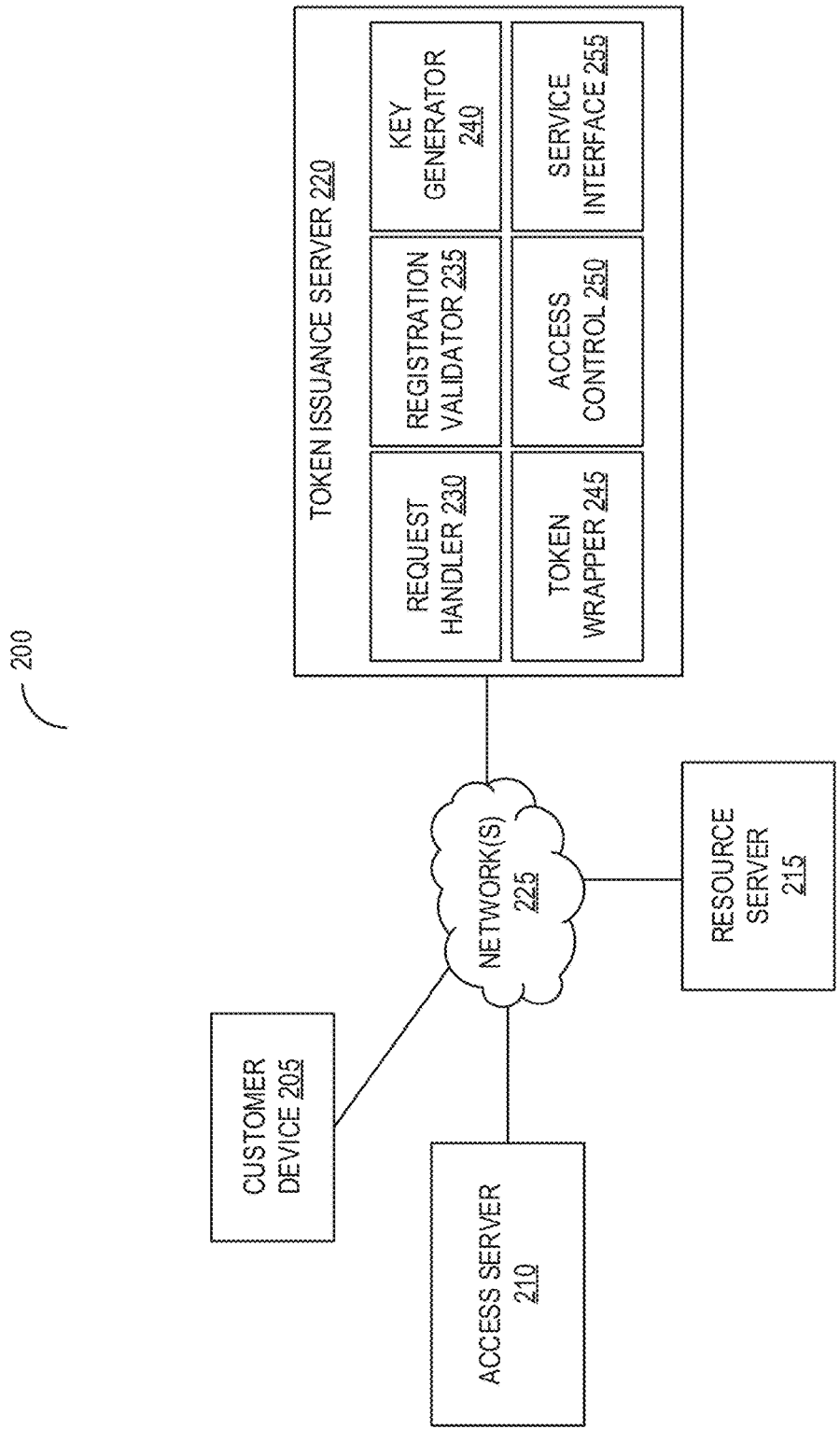
FIG. 2 illustrates a block diagram of an example system for end-to-end encryption for session-less communications in accordance with an illustrative embodiment.

FIG. 2 depicts a block diagram of a system 200 for end-to-end encryption for state-less communications. The system 200 may include a customer device 205 (sometimes referred herein as a client device or customer), an access server 210 (sometimes referred herein as a partner server), a resource server 215, a token issuance server 220 (sometimes referred herein as a gateway), and one or more networks 225. The token issuance server 220 may include a request handler 230, a registration validator 235, a key generator 240, a token wrapper 245, an access controller 250, and a service interface 255, among others. Embodiments may comprise additional or alternative components or omit certain components from those of FIG. 2, and still fall within the scope of this disclosure. For example, the resource server 215 and the token issuance server 220 may be part of the same device. In another example, the key generator 240 and the token wrapper 245 may reside on a server different from the request handler 230, the registration validator 235, the access control 250, and the service interface 255.

Various hardware and software components of one or more public or private networks 230 may interconnect the various components of the system 200. Non-limiting examples of such networks may include Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

The customer device 205 may be any computing device comprising one or more processors coupled with memory and software, and capable of performing the various processes and tasks described herein. The customer device 205 may be in communication with the access server 210, the resource server 215, and the token issuance server 220 via the network 230. Communications from the customer device 205 may be redirected via the network 230 from one component to another. For example, a request to access the resource server 215 may be first redirected to the access server 210 and then to the token issuance server 220.

The access server 210 may be any computing device comprising one or more processors coupled with memory and software and capable of performing the various processes and tasks described herein. The access server 210 may be in communication with the customer device 205, the resource server 215, and the token issuance server 220 via the network 230. Although shown as a single access server 210, the access server 210 may include any number of computing devices. The access server 210 may perform an initial authentication of the customer device 205 in accessing the resource server 215. From the initial authentication, the access server 210 may generate and issue an initial token for the customer device 205.

The resource server 215 may be any computing device comprising one or more processors coupled with memory and software and capable of performing the various processes and tasks described herein. The resource server 215 may be in communication with the customer device 205, the access server 210, and the token issuance server 220 via the network 230. Although shown as a single resource server 215, the resource server 215 may include any number of computing devices. The resource server 215 may host, maintain, or otherwise include a resource. The resource may include an application, programs, processes, files, or data, among others. Access to the resource maintained by the resource server 215 may be controlled by the access server 210 and the token issuance server 220.

The token issuance server 220 may be any computing device comprising one or more processors coupled with memory and software, and capable of performing the various processes and tasks described herein. The token issuance server 220 may be in communication with the customer device 205, the access server 210, and the resource server 215 via the network 230, as well as the token database 225. Although shown as a single token issuance server 220, the token issuance server 220 may include any number of computing devices. The token issuance server 220 may validate the initial token generated by the access server 210 received in the request from the customer device 205. When successfully validated, the token issuance server 220 may generate a client-access token for the customer device 205 for accessing the resource server 215 via session-less communications.

Within the token issuance server 220, the request handler 230 may be or may include computer-readable machine code executable by the token issuance server 220 to parse and process requests to retrieve keys from the customer device 205. The registration validator 235 may be or may include computer-readable machine code executable by the token issuance server 220 to validate initial tokens or device identifiers included in the requests to retrieve keys from the customer device 205. The key generator 240 may be or may include computer-readable machine code executable by the token issuance server 220 to generate encryption keys upon successful validation of the device identifiers. The token wrapper 245 may be or may include computer-readable machine code executable by the token issuance server 220 to transmit access tokens that include the encryption keys to the customer device 205. The access controller 250 may be or may include computer-readable machine code executable by the token issuance server 220 to process requests by the customer device 205 to access the resource service 215. The service interface 255 may be or may include computer-readable machine code executable by the token issuance server 220 to communicate with the resource service 215 in processing the access requests from the customer device 205.

Figure 3:
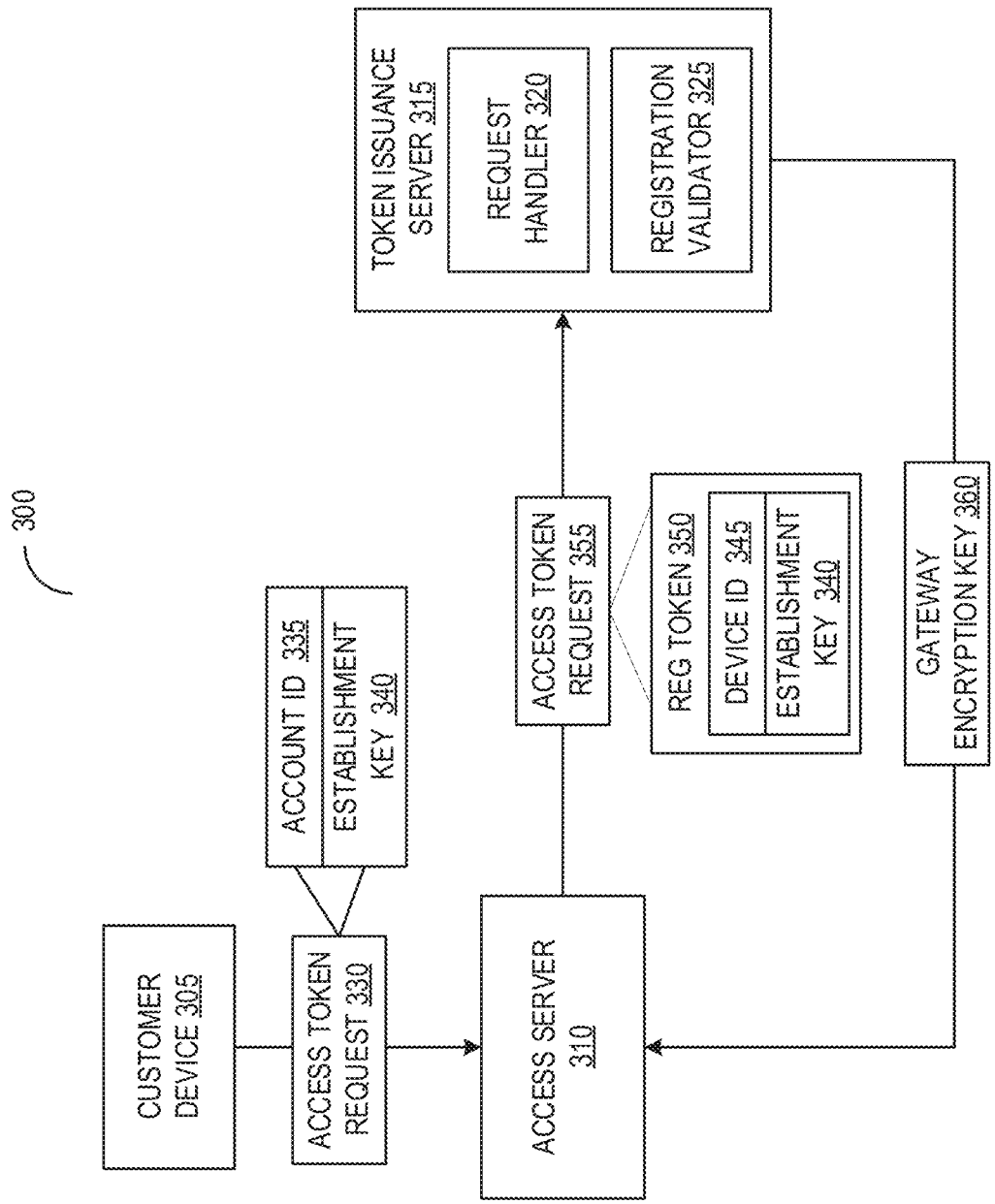
FIG. 3 illustrates a block diagram of an example system for validating initiation tokens in requests to retrieve keys in accordance with an illustrative embodiment.

FIG. 3 depicts a block diagram of a system 300 for validating initiation tokens in requests to retrieve keys. The system 300 may include a customer device 305 (sometimes referred herein as a customer device), an access server 310 (sometimes referred herein as a partner server), and a token issuance server 315 (sometimes referred herein as a gateway), among others. The token issuance server 315 may include a request handler 320 and a registration validator 325. Embodiments may comprise additional or alternative components or omit certain components from those of FIG. 3 and still fall within the scope of this disclosure. Various hardware and software components of one or more public or private networks may interconnect the various components of the system 300. Each component in system 300 (such as the customer device 305, the access server 310, and the token issuance server 315 including the request handler 320 and the registration validator 325) may be any computing device comprising one or more processors coupled with memory and software and capable of performing the various processes and tasks described herein.

The customer device 305 provides, sends, or transmits an access token request 330 (sometimes referred herein generally as an initiation request or a first request) to the access server 310. The access token request 330 may be for the token issuance server 315 to generate encryption keys or access token for the customer device 305. For example, the access token request 330 may be an HTTP POST call (e.g., "POST/E2E") to be sent to the token issuance server 315. The access token request 330 may be or may correspond to a request to authenticate with the token issuance server 315 for the customer device 305 to access a resource service associated with the token issuance server 315. The access token request 330 includes an account identifier 335 and an establishment key 340. The account identifier 335 may reference, correspond to, or identify a user of the customer device 305 or the customer device 305 itself. The establishment key 340 may be used to securely and confidentially deliver the establishment key 340 to the token issuance server 315. The customer device 305 may generate an initiation token to include in the access token request 330. The initiation token may include the account identifier 335 and the establishment key 340. The customer device 305 may send the access token request 330 toward the token issuance server 315 via the access server 310.

The establishment key 340 (also referred herein as an ephemeral key) may have been previously generated and provided by the access server 310 to the customer device 305. The establishment key 340 may have been provided upon success authentication with the access server 310. For example, the customer device 305 may have provided an authentication request to the access server 310 to login at the access server 310. The authentication request may include authentication credentials, such the account identifier and an authentication factor (e.g., password, location, or possession). The account identifier may reference, correspond to, or identify a user of the customer device 305 or the customer device 305 itself and may be used between the customer device 305 and the access server 310. Upon receipt, the access server 310 may validate the authentication credentials in the authentication request. If the validation is successful, the access server 310 may generate the establishment key 340 in accordance with an encryption algorithm (e.g., symmetric encryption). The establishment key 340 may be generated particularly for the customer device 305. Upon receipt, the customer device 305 may generate the access token request 330 to include the establishment key 340 along with the account identifier 335.

The access server 310 retrieves, identifies, or receives the access token request 330 from the customer device 305. The access server 310 may intercept the access token request 330 originating from the customer device 305 and destined to the token issuance server 315. As discussed above, the access server 310 may have already authenticated the customer device 305 for further communications with the access server 310. The access server 310 receives the access token request 330 as part of the authentication process between the customer device 305 and the access server 310. For example, upon successful authentication by the access server 310, the customer device 305 may proceed to generate and provide the access token request 330 and the access server 310 may wait for and receive the access token request 330 transmitted by the customer device 305. Upon receipt, the access server 310 may parse the access token request 330 to extract or identify the account identifier 335 and the establishment key 340. The access server 310 may parse the access token request 330 to extract or identify the initiation token included by the customer device 305.

Based on the contents of the access token request 330, the access server 310 may generate a registration token 350 (sometimes herein referred to as an initiation or initial token). The access server 310 may use the initial token that was generated by the customer device 305 and included in the access token request 330 as the registration token 350. The registration token 350 includes information related to the identity of the customer device 305 and the user of the customer device 305 as well as the identity of the access server 310 itself. For example, the registration token 350 may be a JavaScript Object Notation (JSON) Web Token (JWT) that includes claims-based identity information related to the user of the customer device 305 and the access server 310. The information included in the registration token 350 may be used by the token issuance server 315 to validate the customer device 305 and determine whether to issue encryption keys to the customer device 305 to be used in communications with a resource service. The access server 310 may add, insert, or otherwise include the establishment key 340 into the registration token 350. The access server 310 may also add at least a portion of the information included in the access token request 330 from the customer device 305 into the registration token 350.

In some embodiments, in generating the registration token 350, the access server 310 may determine or generate a device identifier 345 (sometimes referred herein as a client sequence number) to include in the registration token 350. The access server 310 may generate the device identifier 345 that is different from the device identifier 345. The access server 310 may use the account identifier 335 as the device identifier 345. The access server 310 may determine the device identifier 345 that is different from the account identifier 335. The device identifier 335 may be used by the access server 310 and the token issuance server 315 to reference, identify, or correspond to the customer device 305. The access server 310 may perform a look up on a list of identifiers to determine the device identifier 345. The list of identifiers may specify or define a mapping between the device identifiers 345 and the account identifiers 335. The list of identifiers may be maintained on a database accessible to the access server 310 and the token issuance server 315. If included on the list, the access server 310 may add, insert, or otherwise include the device identifier 345 in the registration token 350. Otherwise, if not included in the list, the access server 310 may use the account identifier 335 as the device identifier 345 to include in the registration token 350.

With the generation of the registration token 350, the access server 310 generates an access token request 355 to be transmitted to the token issuance server 315. The access server 310 may modify the key request 330 to use as the access token request 355 to transmit to the token issuance server 315. Similar to the key request 330, the access token request 355 may be to retrieve encryption keys or an access token from the token issuance server 315. The access token request 355 may be or may correspond to a request to authenticate with the token issuance server 315 for the customer device 305 to access a resource service associated with the token issuance server 315. The access token request 355 may include at least a portion of the key request 330 initially generated by the customer device 305. The access token request 355 may include the registration token 350 that includes at least the device identifier 345 and the establishment key 340.

In generating the access token request 355, the access server 310 may encrypt the access token request 355 using a gateway encryption key 360. The gateway encryption key 360 may be provided by the token issuance server 315, and may be used to encrypt and decrypt communications between the access server 310 and the token issuance server 315. The token issuance server 315 may have generated the gateway encryption key 360 in accordance with any asymmetric encryption algorithm. For example, the token issuance server 315 may generate a public key and a private key in an accordance with an asymmetric cryptography (e.g., Rivest-Shamir-Adleman (RSA) algorithm). Upon generation, the token issuance server 315 stores the private key and provides the public key as the gateway encryption key 360 to the access server 310 out of band. The access server 310 may apply the gateway encryption key 360 to at least a portion of content of the access token request 355. The access server 310 may encrypt at least a portion of the registration token 350, such as the device identifier 345, the establishment key 340, or a nonce (sometimes referred herein as a secret), or any combination thereof. Upon encryption, the access server 310 provides, sends, or otherwise transmits the access token request 355 to the token issuance server 315.

The request handler 320 executing on the token issuance server 315 retrieves, identifies, or otherwise receives the access token request 355 from the access server 310. With receipt, the request handler 320 parse the access token request 355 to extract or identify the contents therein, such as the registration token 350. From the registration token 350, the request handler 320 extracts or identifies the device identifier 345 and the establishment key 340. The request handler 320 may decrypt the access token request 355 using an encryption key associated with the gateway encryption key 360. For example, the gateway encryption key 360 may be a public key, and the request handler 320 may decrypt the contents of the access token request 355 using a private key that was previously generated in conjunction with the public key. The request handler 320 may decrypt at least a portion of the registration token 350 included in to the access token request 355, such as the device identifier 345 or the establishment key 340 or both. The request handler 320 may decrypt the portion of the access token request 355 in response to validating the registration token 350 as described below.

Upon identification, the request hander 320 may identify or determine whether the access server 310 is one of a trusted list of access servers. The list may define or identify access server whose key requests are to be trusted for further processing at the token issuance server 315. The determination as to whether the access server 310 is on the trusted list of access servers may be responsive to determining that the registration token 350 is valid, as discussed herein below. When the access server 310 is determined to be not any of the trusted set, the request handler 320 may terminate further processing of the access token request 355 at the token issuance server 315. In terminating, the request handler 320 may restrict access of the customer device 305 to the resource server 315. The request handler 320 may send or transmit an indication of failure to authenticate to the customer device 305 and the access server 310. When the access server 310 is determined to match with one of the trusted set, the request handler 320 may allow for further processing of the access token request 355 at the token issuance server 315.

The registration validator 325 executing on the token issuance server 315 validates the registration token 350 (or the device identifier 345 or a nonce) included in the access token request 355. The registration validator 325 may initiate validation of the registration token 350 in response to determining that the access server 310 is one of the trusted set of access servers. The registration validator 325 may initiate validation of the registration token 350 in response to receipt of the access token request 355. To validate, the registration validator 325 may determine whether the registration token 350 (or the device identifier 345) is encrypted using the gateway encryption key 360. The registration validator 325 may decrypt the registration token 350 using an encryption key associated with the gateway encryption key 360. For example, the gateway encryption key 360 may be a public key, and the registration validator 325 may decrypt the contents of the access token request 355 using a private key that was previously generated in conjunction with the public key.

Using the resultant from the decryption, the registration validator 325 may determine whether the registration token 350 (or the device identifier 345 or the nonce) is well-formed. If the registration token 350 was encrypted using the gateway encryption key 360, the resultant of the decryption should be in an expected format. Otherwise, the resultant may deviate drastically from the expected format. In determining, the registration validator 325 may compare the resultant of the decryption with the expected format. If the resultant is not in compliance with the expected format, the registration validator 325 may determine that the registration token 350 is not valid. The registration validator 325 may determine that the registration token 350 is not encrypted using the gateway encryption key 360. Conversely, if the resultant is in compliance with the expected format, the registration validator 325 may validate the registration token 350. The registration validator 325 may determine that the registration token 350 is encrypted using the gateway encryption key 360.

In some embodiments, the registration validator 325 may further determine whether the device identifier 345 is stored at a database accessible to the token issuance server 315 when the registration token 350 is successfully validated. The database may maintain a list of identifiers mapping between account identifiers (e.g., the account identifier 335) and device identifiers (e.g., the device identifier 345). When the device identifier 345 is determined to be not stored, the registration validator 325 may determine that the account identifier 335 may have been used as the device identifier 345 in the registration token 350. The registration validator 325 may generate a new device identifier 345 and a mapping between the new device identifier 345 and the account identifier 335 for storage on the list of identifiers on the database. Otherwise, when the device identifier 345 is determined to be stored, the registration validator 325 may proceed with further processing on the access token request 355.

Based on the validation, the registration validator 325 may determine whether to issue an access token to the customer device 305. The issuance of the access token may allow, grant, or otherwise permit the customer device 305 to access a resource service associated with the token issuance server 315. When the registration token 350 (or the device identifier 345 therein) is not validated, the registration validator 325 may determine that an access token is not to be issued to the customer device 305, and may restrict generation of an encryption key set for the customer device 305. The registration validator 325 may also terminate further processing of the access token request 355. The registration validator 325 may transmit an indication of the failure to validate to the access server 310 or the customer device 305 via the access server 310. Conversely, when the registration token 350 (or the device identifier 345 therein) is successfully validated, the registration validator 325 may determine that an access token is to be issued to the customer device 305. The registration validator 325 may allow for further processing of the registration token 350 at the token issuance server 315.

Figure 4:
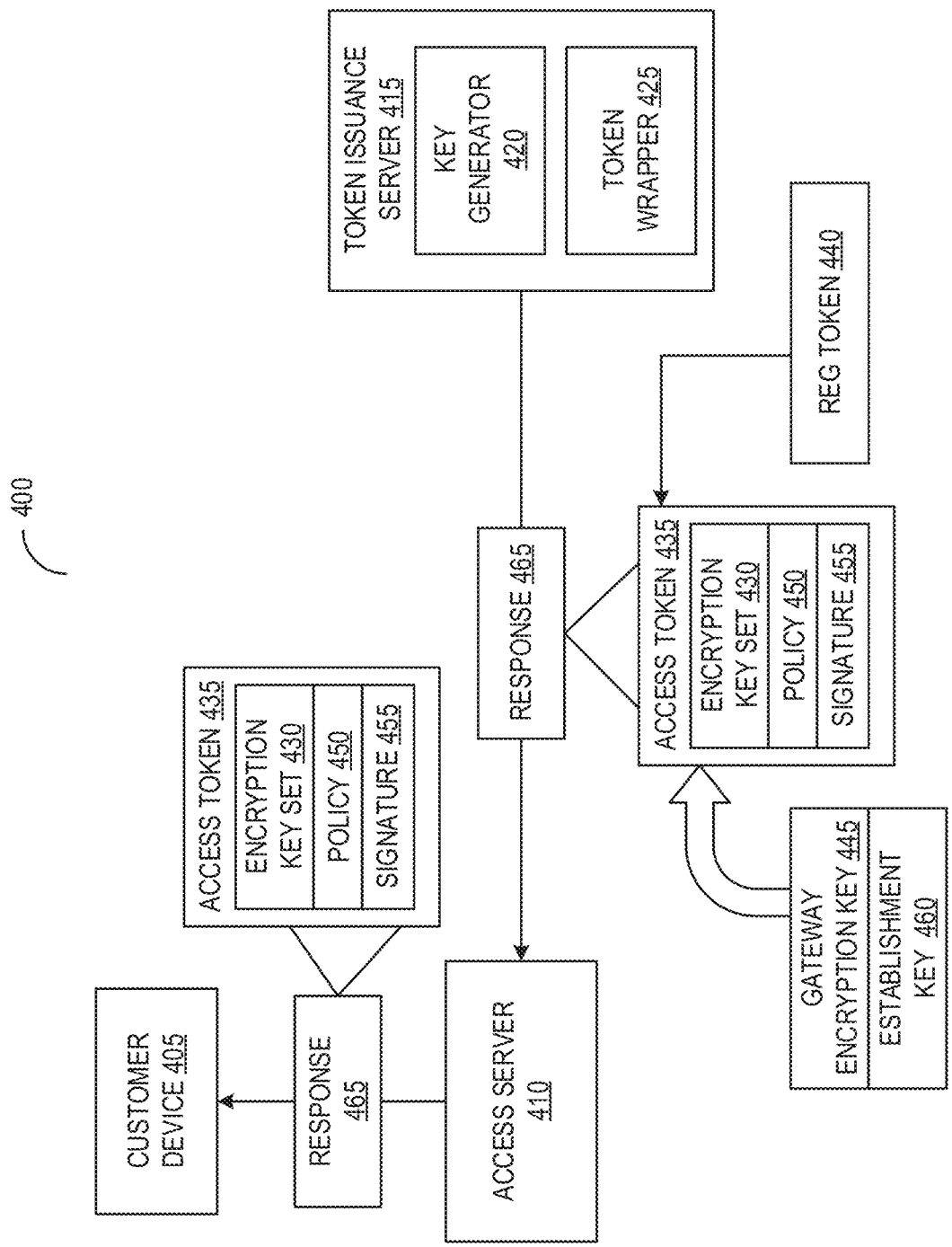
FIG. 4 illustrates a block diagram of an example system for issuance of encryption keys for accessing services in accordance with an illustrative embodiment.

FIG. 4 depicts a block diagram of a system 400 for issuance of encryption keys for accessing services. The system 400 may include a customer device 405 (sometimes referred herein as a customer device), an access server 410 (sometimes referred herein as a partner server), and a token issuance server 415 (sometimes referred herein as a gateway), among others. The token issuance server 415 may include the key generator 420 and the token wrapper 425, among others. Embodiments may comprise additional or alternative components or omit certain components from those of FIG. 4 and still fall within the scope of this disclosure. Various hardware and software components of one or more public or private networks may interconnect the various components of the system 400. Each component in system 400 (such as the customer device 405, the access server 410, and the token issuance server 415 including the key generator 420 and the token wrapper 425) may be any computing device comprising one or more processors coupled with memory and software and capable of performing the various processes and tasks described herein.

The key generator 420 executing on the token issuance server 415 determines, creates, or otherwise generates an encryption key set 430 (sometimes referred herein as "E2E Keys" or end-to-end encryption keys). The generation of the encryption key set 430 may be in response to determining that the customer device 405 is to be issued with an access token 435 for accessing a resource service associated with the token issuance server 415. The encryption key set 430 may be used to encrypt and decrypt communications between the customer device 405 and a resource server via the token issuance server 415. The encryption key set 430 may include one or more encryption keys. The encryption key set 430 may include an symmetric encryption key, a key-hash message authentication code (HMAC) encryption key, and an initialization vector. The symmetric encryption key may be applied to data (e.g., personally identifiable data (PII) to be communicated between the customer device 405 and the resource server. The HMAC key may be used to create digital signatures in communications between the customer device 405 and the resource server through the token issuance server 415. The initialization vector may be used in conjunction with the symmetric encryption key to apply to the data communicated between the customer device 405 and the resource server. Once generated, the key generator 420 may forego maintaining the encryption key set 430 on the token issuance server 415.

The token wrapper 425 executing on the token issuance server 415 generates the access token 435. The access token 435 may be used to allow, grant, or permit the customer device 405 to access the resource service associated with the token issuance server 415. In generating, the token wrapper 425 combines or packages the encryption key set 430 with at least a portion of a registration token 450 into the access token 435. The token wrapper 425 may identify the portion of the registration token 450 to be included. For example, the token wrapper 425 may include an account identifier or a device identifier decrypted from the registration token 450 using a gateway encryption key 445. The account identifier or the device identifier may reference, identify, or otherwise correspond to the customer device 405 or the user of the customer device 405. The token wrapper 425 may include other information from the registration token 440. For example, the registration token 440 may be a JavaScript Object Notation (JSON) Web Token (JWT), and the information taken from the registration token 440 may include some of the claims defined in the JWT.

In addition, the token wrapper 425 may determine or generate a policy 450 to include in the access token 435. The policy 450 may specify or define a lifetime period in which the access token 435 (and the encryption key 430 therein) is considered valid and can be used by the customer device 405 to access the resource service. The lifetime period may range, for example, from 10 minutes to 1 month relative to the time of issuance of the access token 435. The lifetime period defined by the policy 450 may be set or configured by an administrator of the token issuance server 415 or the associated resource service. With the generation, the token wrapper 425 may also package the policy 450 into the access token 435.

Furthermore, the token wrapper 425 may also generate a signature 455 to include in the access token 435. The signature 455 may be subsequently used to authenticate or validate the access token 435 in accessing the resource service associated with the token issuance server 415. The token wrapper 425 may identify at least a portion of the access token 435 (e.g., a nonce, the device identifier, or other information). For example, the token wrapper 425 may identify use the private claim (including device identifier and other information) in the registration token from the access server 410. With the identification, the token wrapper 425 may encrypt the portion using an encryption key, such as one of the encryption key set 430 (e.g., HMAC key and symmetric encryption key). Once encrypted, the token wrapper 425 may use the encrypted portion as the signature 455. With the generation, the token wrapper 425 may also package the signature 455 into the access token 435.

The token wrapper 425 generates a response 465 to transmit to the customer device 405 via the access server 410. The response 465 may include the access token 435 that contains the encryption key set 430, the policy 450, and the signature 455. In generating the response 465, the token wrapper 425 may encrypt at least a portion of the access token 435 included therein. The token wrapper 425 may also apply a counterpart encryption key associated with the gateway encryption key 445 to at least a portion of the access token 435. For example, the gateway encryption key 445 may be a public key and the associated encryption key applied to encryption key set 430 of the access token 435 may be the private key.

The token wrapper 425 sends, provides, or otherwise transmits a response 465 including the access token 435 to the access server 410. Upon transmission, the token wrapper 425 may remove or delete any portion of the access token 435 (including the encryption key set 430) on the token issuance server 415. In this manner, the access token 435 and the encryption key set 430 are not maintained and persistent on the token issuance server 415, thereby freeing up computing resources thereon. The transmission of the response 465 may also permit or enable session-less communications between the customer device 405 and the resource service via the token issuance server 415 using the access token 435.

The access server 410 in turn receives the response 465 containing the access token 435 from the token issuance server 415. The access server 410 may parse the response 465 to extract or identify the access token 435. The access server 410 may decrypt the access token 435 of the response 465 using the gateway encryption key 445 that was previously provided by the token issuance server 415. Upon decryption, the access server 410 may forward or send the response 465 to the customer device 435. The customer device 405 receives the response 465 from the access server 410. The customer device 405 may also parse the response 465 to extract or identify the access token 435. The customer device 405 may decrypt the access token 435 using the establishment key 460 that was previously provided by the access server 410. Upon decryption, the customer device 405 may store and maintain the access token 435 (including the encryption key set 430, the policy 450, and the signature 455) on the customer device 405.

Figure 5:
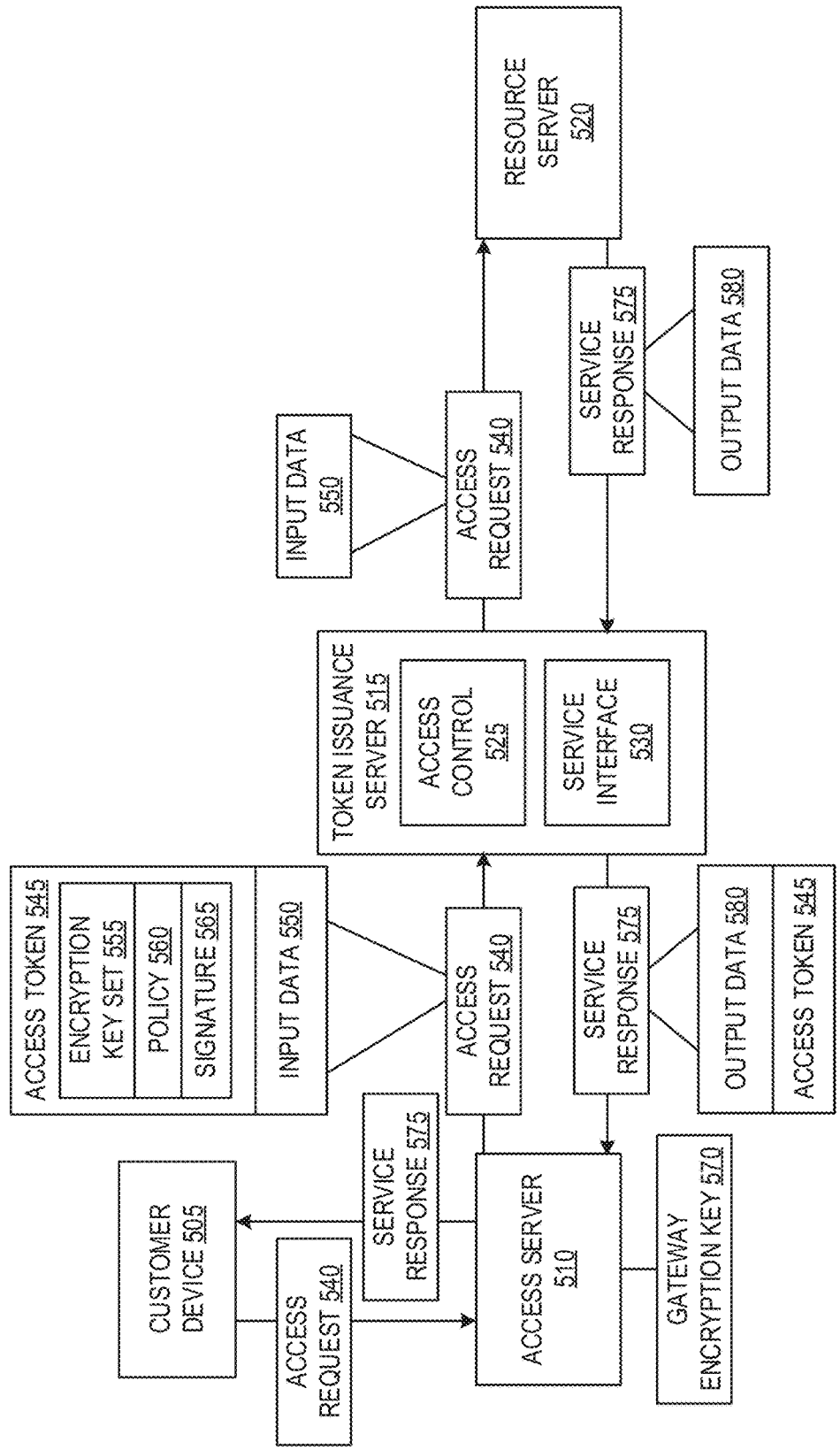
FIG. 5 illustrates a block diagram of an example system for accessing services using access tokens in accordance with an illustrative embodiment.

FIG. 5 depicts a block diagram of a system 500 for accessing services using access tokens. The system 500 may include a customer device 505 (sometimes referred herein as a customer device), an access server 510 (sometimes referred herein as a partner server), a token issuance server 515 (sometimes referred herein as a gateway), and a resource server 520, among others. The token issuance server 515 may include an access control 525 and a service interface 530. Embodiments may comprise additional or alternative components or omit certain components from those of FIG. 5 and still fall within the scope of this disclosure. Various hardware and software components of one or more public or private networks may interconnect the various components of the system 500. Each component in system 500 (such as the customer device 505, the access server 510, the token issuance server 515 including the access control 525 and the service interface 530, and the resource server 520) may be any computing device comprising one or more processors coupled with memory and software and capable of performing the various processes and tasks described herein.

To access the resource server 520, the customer device 505 generate an access request 540 to transmit the resource server 515 via the access server 510 and the token issuance server 515. The access request 540 may be request access of a resource or invoke a function on the resource server 520. For example, the access request 540 may be a request to retrieve data from the resource server 520 or store data at the resource server 520. The access request 540 may include an access token 545. If any data is to be provided to the resource server 520, the access request 540 may further include input data 550 (e.g., in the payload of the access request 540). The access token 545 may include an encryption key set 555, a policy 560, and a signature 565, and may have been stored and maintained on the customer device 505. In generating, the customer device 505 may retrieve the access token 545 from the storage. The customer device 505 may identify the encryption key set 555 from the access token 545, and may apply at least one key from the encryption key set 555 on the input data 550. For example, the input data 550 may be information (e.g., personally identifiable information (PII) to be provided to the resource server 520. The customer device 505 may apply an encryption using an Symmetric encryption key and an initialization vector of the encryption key set 555 to the input data 550.

Upon generation, the customer device 505 may transmit the access request 540 to the resource server 520 via the access server 510 and the token issuance server 515. The access server 510 may in turn receive the access request 540 from the customer device 505. The access server 510 may encrypt at least partially the access request 540 using gateway encryption key 570 that was previously provided by the token issuance server 515. The access server 510 may forward the access request 540 from the customer device 505 to the token issuance server 515 for further processing.

The access control 525 executing on the token issuance server 515 retrieves, identifiers, or receives the access request 540 from the customer device 505 via the access server 510. Upon receipt, the access control 525 may parse the access request 540 to extract or identify the access token 545. The access control 525 may decrypt the access request 540 (including both the access token 545 and the input data 550) using an encryption key associated with the gateway encryption key 570. For example, the gateway encryption key 570 may be a public key, and the access control 525 may decrypt the contents of the access request 540 using a private key that was previously generated in conjunction with the public key.

With the identification, the access control 525 may validate the access token 545 (or the signature 565 included therein). To validate, the access control 525 may identify the signature 565 in the access token 545. In conjunction, the access control 525 may extract or identify at least a portion from the access token 545 (e.g., a nonce or the device identifier). The portion may correspond to the portion that was previously used to generate the signature 565. The access control 525 may encrypt the portion using an encryption key, such as one of the encryption key set 555 (e.g., HMAC key) or a counterpart key to the gateway encryption key 570 (e.g., private key). The access control 525 may compare the encrypted portion with the signature 565. When there is no match, the access control 525 may determine that the access token 545 (and by extension the signature 565) is invalid. Furthermore, the access control 525 may terminate further processing of the access request 540 at the token issuance server 515. The access control 525 may also return and send a message indicating failure to validate to the customer device 505 via the access server 510.

On the other hand, when there is a match, the access control 525 may determine that the access token 545 (and by extension, the signature 565) is valid. The access control 525 may perform additional checks to determine whether the access token 545 is valid. As part of the additional checks, the access control 525 may determine whether the access token 545 is valid in accordance with the policy 560. The access control 525 may maintain a timer to identify a current time. The access control 525 may check the current time against the lifetime period specified by the policy 560. When the current time is determined to be outside the lifetime period, the access control 525 may determine that the access token 545 is no longer valid, and may perform functionalities as described above. Otherwise, when the current time is determined to be within the lifetime period, the access control 525 may determine that the access token 545 is valid.

The service interface 530 executing on the token issuance server 515 may send or forward the access request 540 to the resource server 520, when the access token 545 is determined to be valid. The service interface 530 may remove the access token 545 while maintaining the input data 550 (if any) prior to forwarding the access request 540. The service interface 530 may extract or identify the input data 550 from the access request 540. With the identification, the service interface 530 may decrypt the input data 550 using at least one of the encryption keys in the encryption key set 555. For example, the service interface 530 may apply decryption using an AES encryption key and an initialization vector of the encryption key set 555 to the input data 550. Upon decryption, the server interface 530 may send the input data 550 to the resource server 520 to store the input data 550 thereon.

The resource server 520 may receive the access request 540 from the token issuance server 515. Upon receipt, the resource server 520 may process the access request 540 in accordance with the specifications of the request 540 to generate a service response 575. The access request 540 may be a request to retrieve data (e.g., account information) from the resource server 520 or store the input data 550 (e.g., personally identifiable information) at the resource server 520. When the access request 540 is for retrieval of data, the resource service 520 may identify output data 580 to include in the service response 575. When the access request 540 is for storage of data, the resource server 520 may store and maintain the input data 550 from the access request 540. The resource server 520 may generate the service response 570 to acknowledge or indicate the storage of the input data 550 at the resource server 520. Upon generation, the resource server 520 may send, provide, or otherwise transmit the service response 575 to the token issuance server 515.

The service interface 530 may in turn retrieve, identify, or otherwise receive the service response 575 from the resource server 520. Upon receipt, the service interface 530 may extract or identify the output data 580 (if any) from the service response 575. The service interface 530 may encrypt the service response 575 (or the output data 580) using at least one encryption key from the encryption key set 555 of the access token 545. For example, the service interface 530 may use the AES encryption key and an initialization vector of the encryption key set 555 to encrypt the output data 580 from the resource server 520. Upon encryption, the service interface 530 may insert or include the access token 545 into the service response 575. In addition, the service interface 530 may further encrypt the service response 575 (including the output data 580 and the access token 545) using the encryption key associated with the gateway encryption key 570. For example, the service interface 530 use a private key that was generated in conjunction with a public key that is the gateway encryption key 570 to encrypt the service response 575. The service interface 530 may send, provide, or otherwise transmit the service response 575 to the customer device 575 via the access server 510. Upon transmission, the service interface 530 may remove or delete any portion of the access token 545 (including the encryption key set 555) on the token issuance server 515. In this manner, the access token 545 and the encryption key set 555 are not maintained and persistent on the token issuance server 515, thereby freeing up computing resources thereon.

The access server 510 in turn receives the service response 575 containing the access token 545 from the token issuance server 515. The access server 510 may parse the service response 575 to extract or identify the access token 545. The access server 510 may decrypt the access token 545 of the service response 575 using the gateway encryption key 570 that was previously provided by the token issuance server 515. Upon decryption, the access server 510 may forward or send the service response 575 to the customer device 505. The customer device 505 receives the service response 575 from the access server 510. The customer device 505 may also parse the service response 575 to extract or identify the access token 545. The customer device 505 may decrypt the access token 545 using the establishment key 570 that was previously provided by the access server 510. Upon decryption, the customer device 505 may store and maintain the access token 545 (including the encryption key set 555, the policy 560, and the signature 565) on the customer device 505. Furthermore, the customer device 505 may decrypt the output data 580 (if any) using at least one encryption key of the encryption key set 555. For example, the customer device 505 may apply decryption using an AES encryption key and an initialization vector of the encryption key set 555 to the output data 580.

With the access token 545 and the encryption key set 555 not persistent at the token issuance server 515, communications between the customer device 505 and the resource server 520 may be session-less. At this same time, since the access token 545 containing the encryption key set 555 is passed to the token issuance server 515 each time the customer device 505 is to access the resource server 520, the end-to-end encrypted communications may be achieved. In this manner, the various complexities arising from initiating and establishing communication sessions may be avoided. Moreover, the overhead involving in maintaining the communication session may be reduced if not eliminated. In this manner, the computing resources and network bandwidth may be saved across the customer device 505, the access server 510, the token issuance server 515, and the resource server 520, all the while protecting data integrity and achieving end-to-end encryption.

Figure 6:
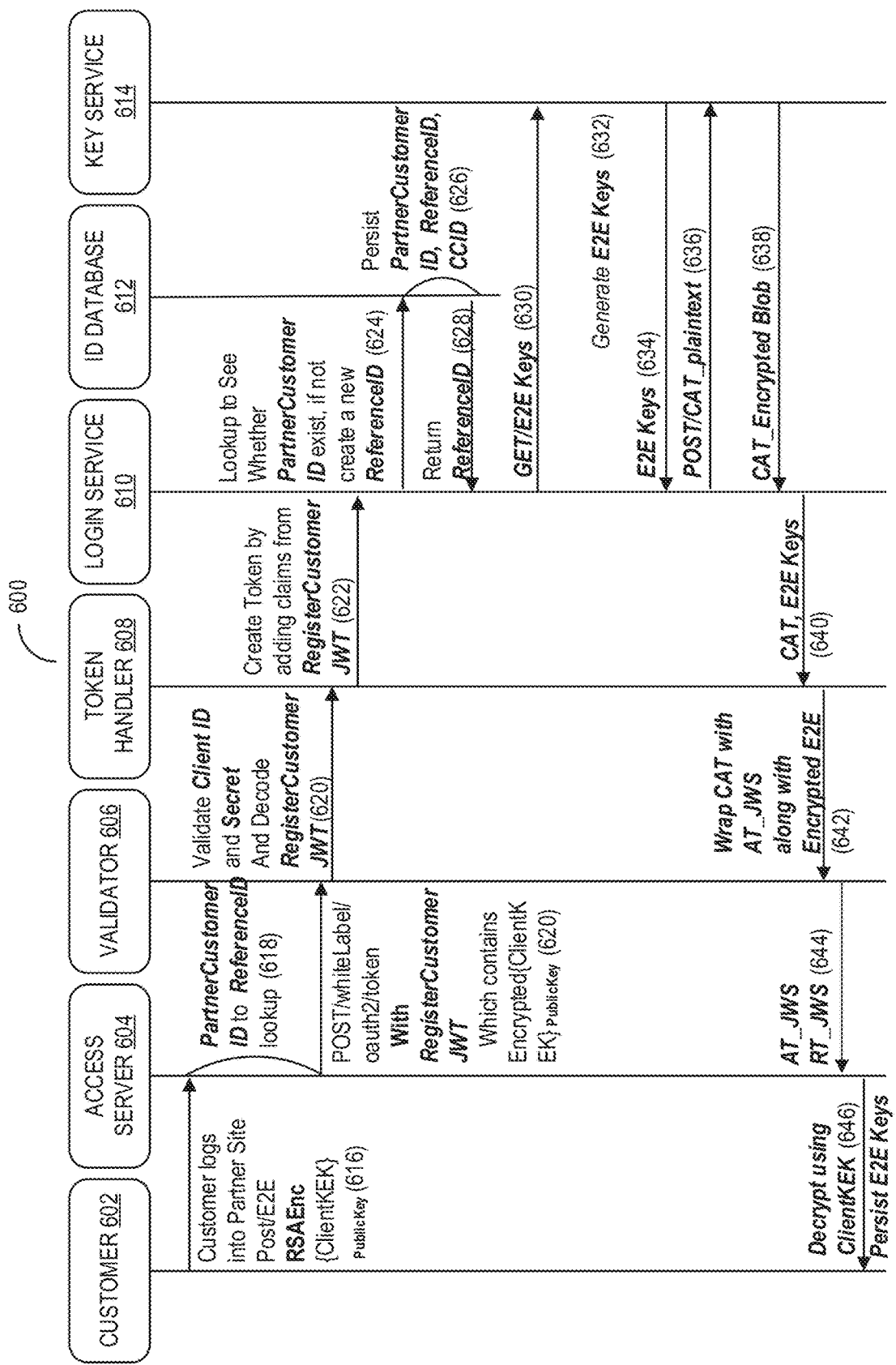
FIG. 6 illustrates a communication diagram of an example process of validating initiation tokens in requests to retrieve keys and issuing encryption keys for accessing services in accordance with an illustrative embodiment.

FIG. 6 depicts a communication diagram of a process 600 of validating initiation tokens in requests to retrieve keys and issuing encryption keys for accessing services. Embodiments may include additional, fewer, or different operations from those described in the process 600. The process 600 may be performed by a number of devices executing machine-readable software code, though it should be appreciated that the various operations may be performed by one or more computing devices and/or processors. The devices performing the process 600 may include a customer 602, an access server 604, a validator 606, a token handler 608, a login service 610, an identifier (ID) database 612, and a key service 614, among others.

At step 616, the customer 602 logs on onto the access server 604 in conjunction with a request to retrieve keys (e.g., "POST/E2E"). The request may include an ephemeral encryption key (e.g., "ClientKEK") used between the customer 602 and the access server 604. The ephemeral encryption key itself may be encrypted using an encryption key (e.g., "PublicKey") provided by the validator 606. At step 618, the access server 604 performs a look up of a reference identifier using a customer identifier that corresponds to a user of the customer 602. At step 620, the access server 604 forwards the request to retrieve keys (e.g., "POST/whiteLabel/oauth2/token") to the validator 606. The request forwarded by the access server 604 may include a device identifier corresponding to the customer 602 as well as an initial token (e.g., in the form of a JavaScript Object Notation (JSON) web token (JWT)). The request may be encrypted using the encryption key provided by the validator 606.

At step 620, the validator 606 validates the contents of the request such as the client identifier and the secret. The validator 606 may also decode the initial token using the encryption key used to encrypt the request at the access server 604. The validator 606 may recover the ephemeral key from the request. Upon decoding, the validator 606 may send the decoded token to the token handler 608. At step 622, the token handler 608 creates a token by adding claims from the initial token from the access server 604, and may forward the token to the login service 610 for further processing. At step 624, the login service 610 may perform a look up to determine the customer identifier corresponding to the user of the customer 602 exists on the identifier database 612. If the customer identifier is determined to not exist, the identifier database 612 may create a reference identifier. At step 626, the identifier database 612 stores and maintains the partner identifier and the reference identifier. At step 628, the identifier database 612 may return the reference identifier to the login service 610.

At step 630, the login service 610 may send a request to retrieve keys (e.g., "GET/E2E Keys") to the key service 614. At step 632, upon receipt of the request, the key service 614 may generate encryption keys, such as an Advanced Encryption Standard (AES) encryption key, a key-hash message authentication code (HMAC) encryption key, and an initialization vector, among others. At step 634, the key service 614 may return the encryption keys to the login service 610. At step 636, the login service 610 may generate and send an access token to the key service 614. The access token may be in the form of a plaintext. At step 638, the key service 614 may receive the access token and may encrypt at least a portion of the access token to generate an encrypted portion (e.g., "Encrypted Blob"). The key service 614 may return the encrypted portion to the login service 610.

At step 640, the login service 610 may forward the encrypted access token along with the encryption keys to the token handler 608. At step 642, the token handler 608 may wrap the access token with a digital signature (e.g., in the form of a JSON web signature (JWS)) and the encryption keys. Once wrapped, the token handler 608 may send the access token, the digital signature, and the encryption keys to the validator 606. At step 644, the validator 606 may forward the access token with the signature (e.g., "AT_JWS") and at least a portion of the initial token with the signature (e.g., "RT_JWS") to the access server 604. The access token and the portion of the initial token may be encrypted using the ephemeral key provided by the access server 604. At step 646, the access server 604 in turn decrypts the received content using the ephemeral key and forwards the content to the customer 602. At step 648, the customer 602 may store and maintain the encryption keys generated by the key service 614 against the issued access token.

Figure 7:
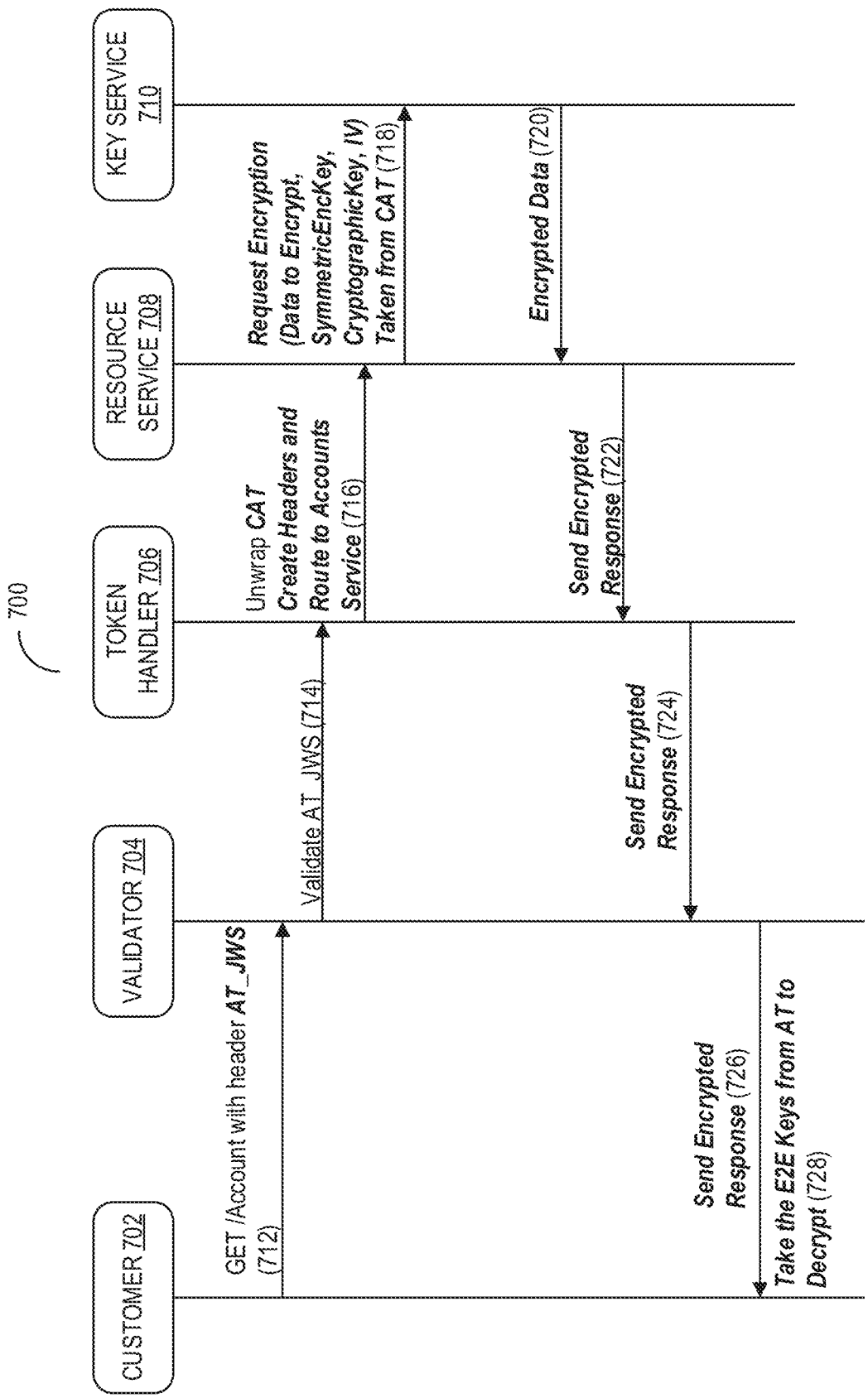
FIG. 7 illustrates a communication diagram of an example process of accessing encrypted data from resources services in accordance with an illustrative embodiment.

FIG. 7 depicts a communication diagram of a process 700 of accessing encrypted data from resources services. Embodiments may include additional, fewer, or different operations from those described in the process 700. The process 700 may be performed by a number of devices executing machine-readable software code, though it should be appreciated that the various operations may be performed by one or more computing devices and/or processors. The devices performing the process 700 may include a customer 702, a validator 704, a token handler 706, a resource service 708, and a key service 710, among others.

At step 712, the customer 702 sends a request to retrieve data (e.g., "GET/Account") from the resource service 708. The request may be sent to the validator 704 via a partner server residing between the customer 702 and the validator 704. The request may include the access token, the encryption keys, and the digital signature previously provided by the token handler 706. At step 714, the validator 704 may receive the request and validate the digital signature. If the validation is successful, the validator 704 may forward the access token to the token handler 706. At step 716, the token handler 706 may unwrap the access token to create headers and route the request to an accounts service (e.g., the resource service 708). At step 718, upon receipt, the resource service 708 may identify the requested data and may further request the key service 710 to encrypt the data using the encryption keys. The encryption keys may include, for example, an Symmetric encryption key, a hash-based cryptographic (e.g., key-hash message authentication code (HMAC)) encryption key, and an initialization vector, among others.

At step 720, the key service 710 may encrypt the data from the resource service 708 using the encryption keys, and return the encrypted data to the resource service 708. At step 722, the resource service 708 may send a response that includes the encrypted data to the token handler 706. At step 724, the token handler 706 may forward the response with the encrypted data to the validator 704. At step 726, the validator 704 may in turn forward the response to customer 702. The response may be sent to the customer 702 via the partner server residing between the customer 702 and the validator 704. At step 728, the customer 702 may decrypt the data included in the response using the encryption keys previously provided by the key service 710.

Figure 8:
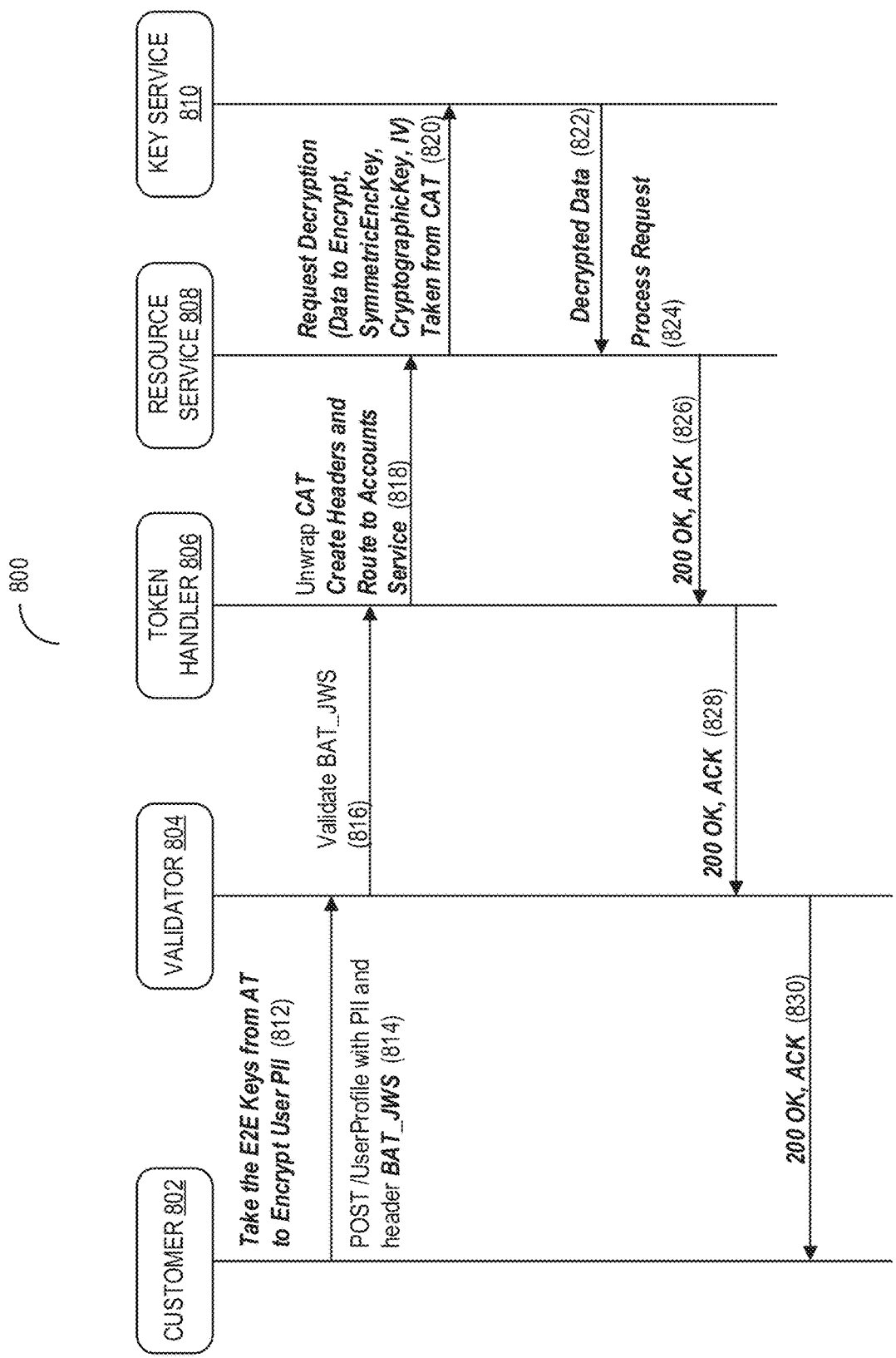
FIG. 8 illustrates a communication diagram of an example process of storing data to be encrypted at resources services in accordance with an illustrative embodiment.

FIG. 8 depicts a communication diagram of a process 800 of storing data to be encrypted at resources services. Embodiments may include additional, fewer, or different operations from those described in the process 800. The process 800 may be performed by a number of devices executing machine-readable software code, though it should be appreciated that the various operations may be performed by one or more computing devices and/or processors. The devices performing the process 800 may include a customer 802, a validator 804, a token handler 806, a resource service 808, and a key service 810, among others.

At step 812, the customer 802 may identify encryption keys from an access token that was previously generated by the key service 810. The encryption keys may include, for example, an Symmetric encryption key, a hash-based cryptographic (e.g., key-hash message authentication code (HMAC)) encryption key, and an initialization vector, among others. Using the encryption keys, the customer 802 may encrypt data (e.g., personally identifiable information (PII)) destined to be processed by the resource service 808. At step 814, the customer 802 sends a request to process the data (e.g., "GET/UserProfile") by the resource service 808. The request may be sent to the validator 804 via a partner server residing between the customer 802 and the validator 804. The request may include the access token, the encryption keys, and the digital signature previously provided by the token handler 806.

At step 816, the validator 804 may receive the request and validate the digital signature. If the validation is successful, the validator 804 may forward the access token to the token handler 806. At step 818, the token handler 806 may unwrap the access token to create headers and route the request to an accounts service (e.g., the resource service 808). At step 820, upon receipt, the resource service 808 may identify the encrypted data from the request, and may further request the key service 810 to decrypt the data using the encryption keys included with the request. At step 822, the key service 810 may decrypt and return the data to the resource service 808. At step 824, the resource service 808 may process the decrypted data in accordance with the request. For example, the resource service 808 may store the now-decrypted personally identifiable information (PII) that was included in the request from the customer 802. At step 826, upon completion, the resource service 808 may return an acknowledgement (e.g., "OK, ACK" HTTP) to the token handler 806. At step 828, the token handler 806 may forward the acknowledgement to the validator 804. At step 830, the validator 804 may in turn forward the acknowledgement to customer 802. The acknowledgement may be sent to the customer 802 via the partner server residing between the customer 802 and the validator 804.

Figure 9A:
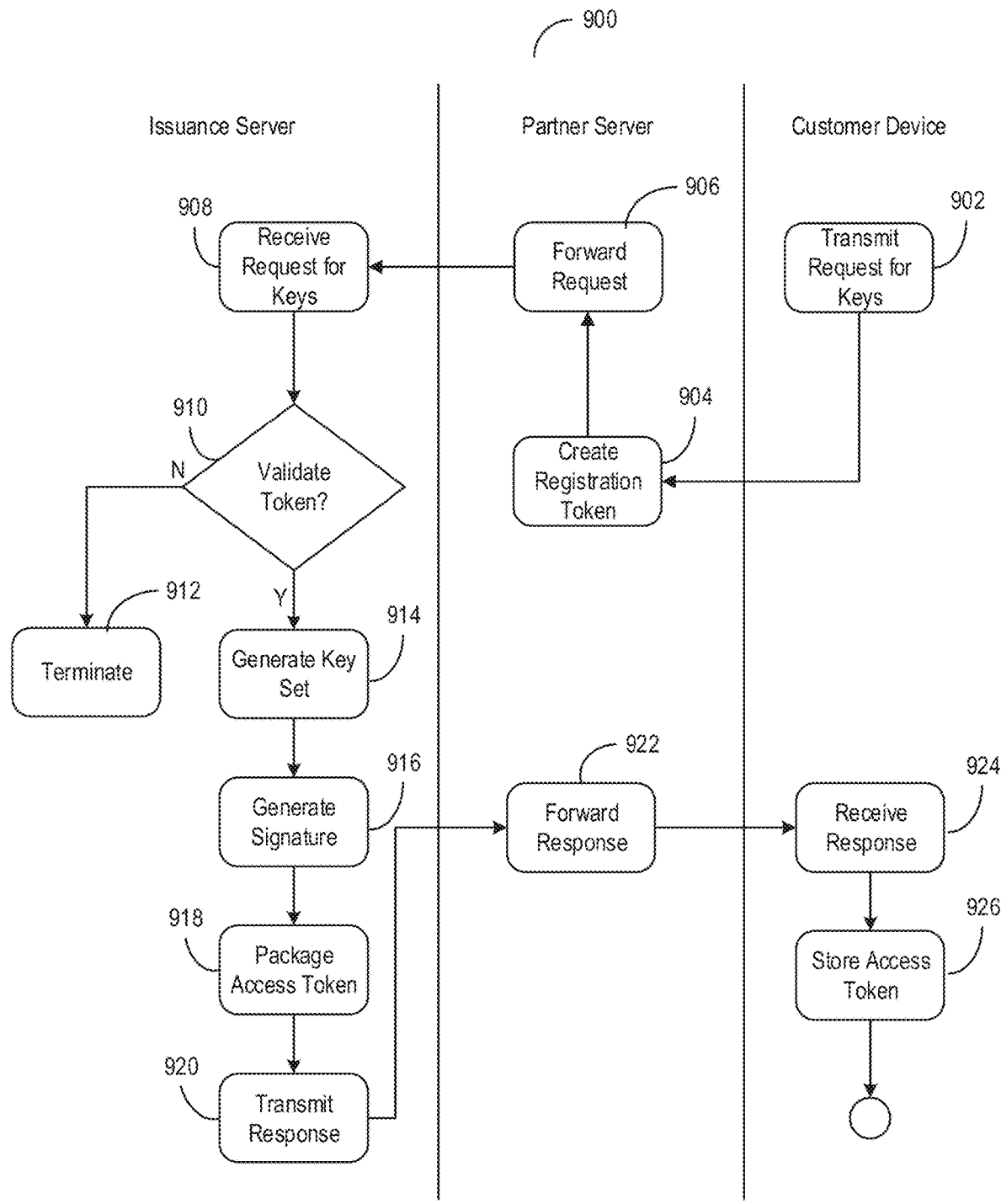
FIGS. 9A and 9B each illustrate a flow diagram of an example method of end-to-end encryption for state-less communications in accordance with an illustrative embodiment.
Figure 9B:
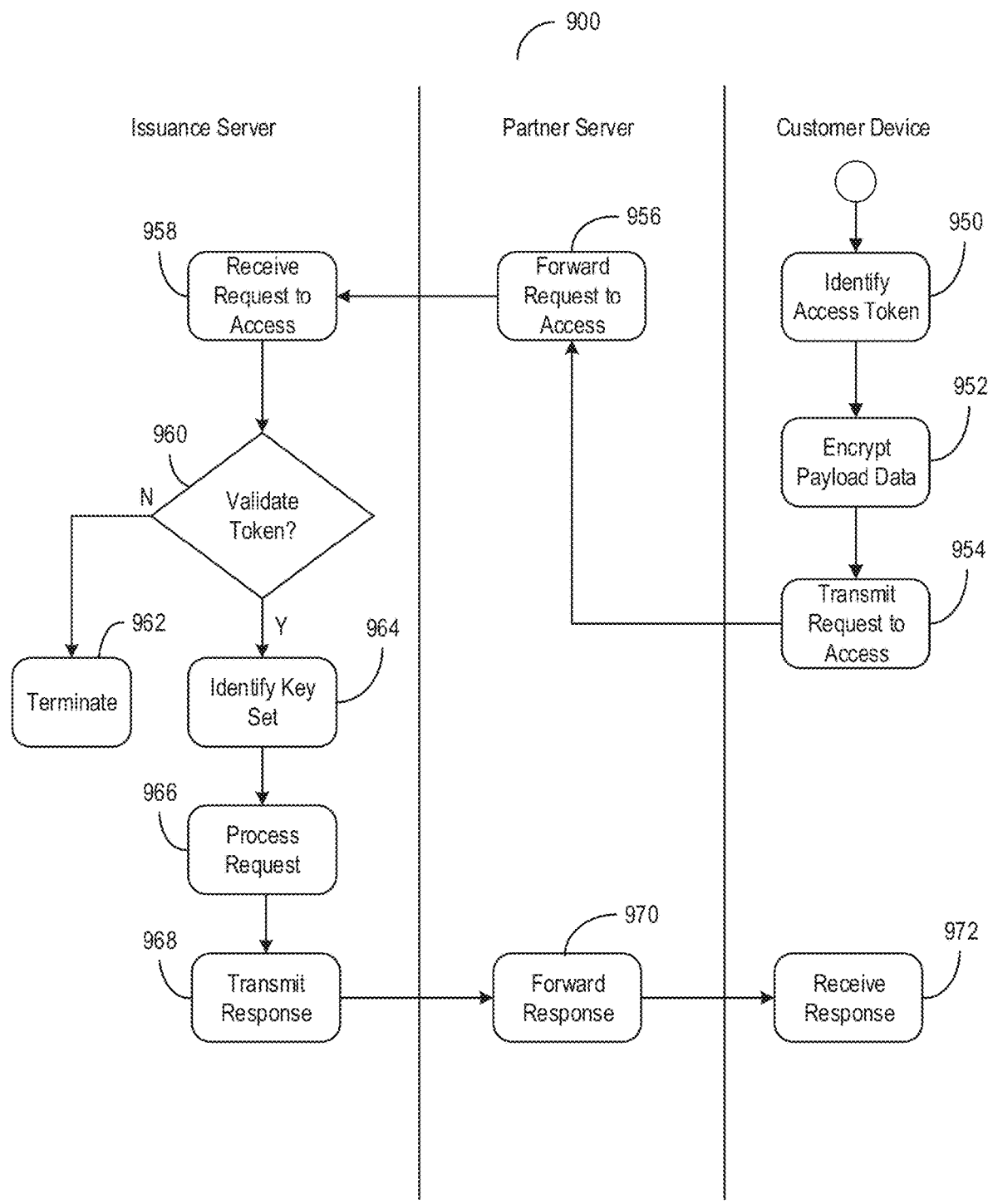

FIGS. 9A and 9B each depicts a flow diagram of a method 900 of end-to-end encryption for session-less communications. Embodiments may include additional, fewer, or different operations from those described in the method 900. The method 900 may be performed by a server executing machine-readable software code, though it should be appreciated that the various operations may be performed by one or more computing devices and/or processors.

At step 902, a customer device transmits a request for keys to a partner server. The request may include an account identifier and an ephemeral key. The account identifier may correspond to a user of the customer device. The ephemeral key may have been previously generated by the partner server as part of an authentication of the customer device. At step 904, the partner server may create a registration token to include into the request for keys. The registration token may include information related to the identity of the customer device, such as a device identifier for the customer device. The partner server may determine the device identifier using the account identifier. The partner server may encrypt the registration token using a public key provided by an issuance server. At step 906, the partner server may forward the request for keys to the issuance server.

At step 908, the issuance server may receive the request for keys from the partner server. Upon receipt, the issuance server may parse the request for keys to identify the registration token. The issuance server may decrypt the registration token using a private key that is associated with the public key provided to the partner server. At step 910, the issuance server may determine whether the registration token is valid. To determine, the issuance server may determine whether the decrypted registration token is in an expected form. If the registration token is in the expected form, the issuance server may determine that the registration token is valid. Otherwise, if not, the issuance server may determine that the registration token is invalid. At step 912, when the registration token is determined to be invalid, the issuance server may terminate further processing of the request for keys.

At step 914, when the registration token is determined to be valid, the issuance server may generate an encryption key set. The encryption key set may be used to encrypt and decrypt communications between the customer device and a resource service through the issuance server. The encryption key set may include at least one key (e.g., AES encryption key) to encrypt and decrypt payload data and at least one key (e.g., HMAC key) to generate signatures. At step 916, the issuance server may generate a signature. The signature may be generated using one of the encryption keys of the encryption key set. The signature may be used to validate future access requests. At step 918, the issuance server may package an access token. The access token may be packaged to include the encryption key set and the signature. The issuance server may generate a policy defining a lifetime duration for the access token.

At step 920, the issuance server may transmit a response including the access token to the partner server. Before transmission, the issuance server may encrypt the response using the private key. After transmission, the issuance server may remove any instances of the access token at the issuance server. At step 922, the partner server may in turn receive and forward the response to the customer device. While forwarding the response, the partner server may decrypt the response using the public key provided by the issuance server. At step 924, the customer device may receive the response from the partner server. Upon receipt, the customer device may parse the response to identify the access token. At step 926, the customer device may store and maintain the access token for future requests to access the resource server through the issuance server.

At step 950, the customer device may identify the access token to access the resource server. The customer device may retrieve the access token from storage. The access token may include the encryption key set and the signature. At step 952, the customer device may encrypt payload data to be provided to the resource server. At step 954, the customer device may transmit the request to access to the partner server. The request to access may include the access token and the encrypted payload data. At step 956, the partner server may receive and forward the request to access to the issuance server. In forwarding the request, the partner server may encrypt the registration token using a public key provided by an issuance server.

At step 958, the issuance server may receive the request to access from the partner server. Upon receipt, the issuance server may parse the request for keys to identify the access token. The issuance server may decrypt the access token using a private key that is associated with the public key provided to the partner server. At step 960, the issuance server may determine whether the access token is valid. To determine, the issuance server may identify a portion of the access token used to generate the signature, and encrypt the portion using one of the encryption key sets. The issuance server may compare the portion to the signature. When there is a match, the issuance server may determine that the access token is valid. When there is no match, the issuance server may determine that the access token is invalid. At step 962, when the access token is determined to be invalid, the issuance server may terminate further processing of the request.

At step 964, when the access token is determined to be valid, the issuance server may identify the encryption key set from the access token. At step 966, the issuance server may process the access request. In processing, the issuance server may decrypt any payload data using one of the encryption key sets. The issuance server may forward the request (without the access token) to the resource server. The resource server may then perform any actions in accordance with the request, and provide a response to the issuance server.

At step 968, the issuance server may transmit the response from the resource server to the partner server. Prior to transmission, the issuance server may encrypt any output data in the response using one of the encryption key sets. In addition, the issuance server may include the access token in the response. The issuance server may also encrypt the response using the private key. At step 970, the partner server may receive the response from the issuance server and forward the response to the customer device. In forwarding, the partner server may decrypt the response using the public key previous provided by the issuance server. At step 972, the customer device may receive the response from the partner server.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method, comprising:
   generating, by a customer device, a request to access a service via at least one server, the request including (i) a token provided by the at least one server and (ii) a first data encrypted using an encryption key of the first token;
   transmitting, by the customer device, the request via the at least one server to the service, the at least one server configured to forward the first data of the request decrypted using the first encryption key to the service in response to validation of the first token;
   receiving, by the customer device from the service via the at least one server, a response including (i) the token provided by the at least one server and (ii) second data generated by the service in response to request and encrypted using the encryption key; and
   decrypting, by the customer device, at least a portion of the second data in the response using the encryption key of the token.

2. The method of claim 1, further comprising:
   generating, by the customer device, subsequent to the request, a second request to access the service via the at least one server, the second request including (i) the token provided by the at least one server and (ii) third data encrypted using the encryption token of the first token;
   transmitting, by the customer device, the second request via the at least one server to the service; and receiving, by the customer device from the at least one server, an indication that the first token is invalid, responsive to the at least one server determining that the first token has expired.

3. The method of claim 1, further comprising:
transmitting, by the customer device to a first server of the at least one server, a second request to retrieve keys to access the service, the first server configured to transmit the second request with a second token encrypted using a second encryption key to a second server of the at least one server; and
receiving, by the customer device from the second server via the first server, the token including (i) at least a portion of the second token and (ii) the encryption key for accessing the service, responsive to validating the second token.

4. The method of claim 1, further comprising:
transmitting, by the customer device to a first server of the at least one server, a second request to retrieve keys to access the server, the second request including an identifier associated with the customer device to be used to register at a second server of the at least one server; and
receiving, by the customer device the token from the second server via the first server, responsive to registration of the customer device at the second server.

5. The method of claim 1, further comprising:
transmitting, by the customer device to a first server of the at least one server, a second request to retrieve keys to access the service, the first server configured to transmit the second request with a second token encrypted using a second encryption key to a second server of the at least one server; and
receiving, by the customer device from the second server via the first server, an indication of failure to validate the second token, responsive to determining that the customer device is not to be issued.

6. The method of claim 1, further comprising:
transmitting, by the customer device to the at least one server, authentication information for communications with the at least one server through which to access the service; and
receiving, by the customer device from the at least one server, a second encryption key to encrypt and decrypt communications between the customer device and the at least one server, responsive to authenticating the customer device.

7. The method of claim 1, wherein generating the request further comprises generating the request to identify the first data to be stored on the service, wherein the at least one server is configured to decrypt the first data using the encryption key of the token prior to forwarding to the service.

8. The method of claim 1, wherein receiving the response further comprises receiving the response to acknowledge storage of the first data on the service, responsive to the request identifying that the first data is to be stored on the service.

9. The method of claim 1, wherein generating the request further comprises generating the request to include the token comprising: (i) a set of encryption keys including the encryption key used to encrypt the first data, (ii) a policy identifying a condition in which the token is valid, and (iii) a signature to authenticate the token for use in accessing the service through the at least one server.

10. The method of claim 1, further comprising exchanging, by the customer device, data with the service via the at least one server over session-less communications.

11. A system, comprising:
a customer device having one or more processors coupled with memory, configured to:
generate a request to access a service via at least one server, the request including (i) a token provided by the at least one server and (ii) a first data encrypted using an encryption key of the first token;
transmit the request via the at least one server to the service, the at least one server configured to forward the first data of the request decrypted using the first encryption key to the service in response to validation of the first token;
receive, from the service via the at least one server, a response including (i) the token provided by the at least one server and (ii) second data generated by the service in response to request and encrypted using the encryption key; and
decrypt at least a portion of the second data in the response using the encryption key of the token.

12. The system of claim 11, wherein the customer device is further configured to:
generate, subsequent to the request, a second request to access the service via the at least one server, the second request including (i) the token provided by the at least one server and (ii) third data encrypted using the encryption token of the first token;
transmit the second request via the at least one server to the service; and
receive, from the at least one server, an indication that the first token is invalid, responsive to the at least one server determining that the first token has expired.

13. The system of claim 11, wherein the customer device is further configured to
transmit, to a first server of the at least one server, a second request to retrieve keys to access the service, the first server configured to transmit the second request with a second token encrypted using a second encryption key to a second server of the at least one server; and
receive, from the second server via the first server, the token including (i) at least a portion of the second token and (ii) the encryption key for accessing the service, responsive to validating the second token.

14. The system of claim 11, wherein the customer device is further configured to:
transmit, to a first server of the at least one server, a second request to retrieve keys to access the server, the second request including an identifier associated with the customer device to be used to register at a second server of the at least one server; and
receive the token from the second server via the first server, responsive to registration of the customer device at the second server.

15. The system of claim 11, wherein the customer device is further configured to:
transmit, to a first server of the at least one server, a second request to retrieve keys to access the service, the first server configured to transmit the second request with a second token encrypted using a second encryption key to a second server of the at least one server; and receive, from the second server via the first server, an indication of failure to validate the second token, responsive to determining that the customer device is not to be issued.

16. The system of claim 11, wherein the customer device is further configured to transmit, to the at least one server, authentication information for communications with the at least one server through which to access the service; and receive, from the at least one server, a second encryption key to encrypt and decrypt communications between the customer device and the at least one server, responsive to authenticating the customer device.

17. The system of claim 11, wherein the customer device is further configured to generate the request to identify the first data to be stored on the service, wherein the at least one server is configured to decrypt the first data using the encryption key of the token prior to forwarding to the service.

18. The system of claim 11, wherein the customer device is further configured to receive the response to acknowledge storage of the first data on the service, responsive to the request identifying that the first data is to be stored on the service.

19. The system of claim 11, wherein the customer device is further configured to generate the request to include the token comprising: (i) a set of encryption keys including the encryption key used to encrypt the first data, (ii) a policy identifying a condition in which the token is valid, and (iii) a signature to authenticate the token for use in accessing the service through the at least one server.

20. The system of claim 11, wherein the customer device is further configured to exchange data with the service via the at least one server over session-less communications.

* * * * *